United States Patent

Handa et al.

[11] Patent Number: 5,182,695
[45] Date of Patent: Jan. 26, 1993

[54] CERAMIC COMPOSITION AND ELECTRONIC PART USING THE SAME

[75] Inventors: Kiyoji Handa; Satoshi Mukaeda, both of Nagai; Hideyuki Kanai, Kawasaki; Yohachi Yamashita, Kawasaki; Osamu Furukawa, Kawasaki; Mitsuo Harata, Kawasaki, all of Japan

[73] Assignees: Marcon Electronics Co., Ltde., Nagai; Kabushiki Kaisha Toshiba, Kawasaki, both of Japan

[21] Appl. No.: 743,361
[22] PCT Filed: Dec. 21, 1990
[86] PCT No.: PCT/JP90/01669
  § 371 Date: Jul. 23, 1991
  § 102(e) Date: Jul. 23, 1991
[87] PCT Pub. No.: WO91/09814
  PCT Pub. Date: Jul. 11, 1991

[30] Foreign Application Priority Data

Dec. 22, 1989 [JP] Japan .................... 1-331054

[51] Int. Cl.$^5$ .............................. H01G 4/12
[52] U.S. Cl. .................... 361/321; 501/135; 501/136
[58] Field of Search .............. 501/135, 136; 361/321

[56] References Cited

U.S. PATENT DOCUMENTS

| 4,536,821 | 8/1985 | Wheeler et al. | 501/136 |
| 4,744,972 | 5/1988 | Ogata et al. | 501/136 |
| 4,818,736 | 4/1989 | Yamashita et al. | 501/136 |
| 4,882,652 | 11/1989 | Furukawa et al. | 501/136 |
| 4,897,373 | 1/1990 | Inoue et al. | 501/136 |

FOREIGN PATENT DOCUMENTS

| 55-119306 | 9/1980 | Japan . |
| 55-121957 | 9/1980 | Japan . |
| 56-160372 | 12/1981 | Japan . |
| 58-214201 | 12/1983 | Japan . |
| 59-197119 | 11/1984 | Japan . |
| 61-28620 | 7/1986 | Japan . |
| 62-254310 | 11/1987 | Japan . |
| 63-108611 | 5/1988 | Japan . |
| 63-108612 | 5/1988 | Japan . |

*Primary Examiner*—Mark L. Bell
*Assistant Examiner*—Deborah Jones
*Attorney, Agent, or Firm*—Oblon, Spivak, McClelland, Maier & Neustadt

[57] ABSTRACT

A ceramic composition which forms, when sintered, a dielectric having a crystal structure represented by the general formula:

$$[Pb_{1-x}A_x]_{[A]}(B_1,B_2)_{[B]}O_3$$

where A is at least one element selected from the group consisting of Ca, Sr, Ba, Ag, La and Nd, $B_1$ is at least one element selected from the group consisting of Mg, Zn, Ni, Co, Fe, Mn and In, $B_2$ is at least one element selected from the group consisting of Nb, W, Ta and Sb, x is 0 to 0.5, and the molar ratio of [A]/[B] is 0.995 or more, but 0.99 or less.

6 Claims, 1 Drawing Sheet

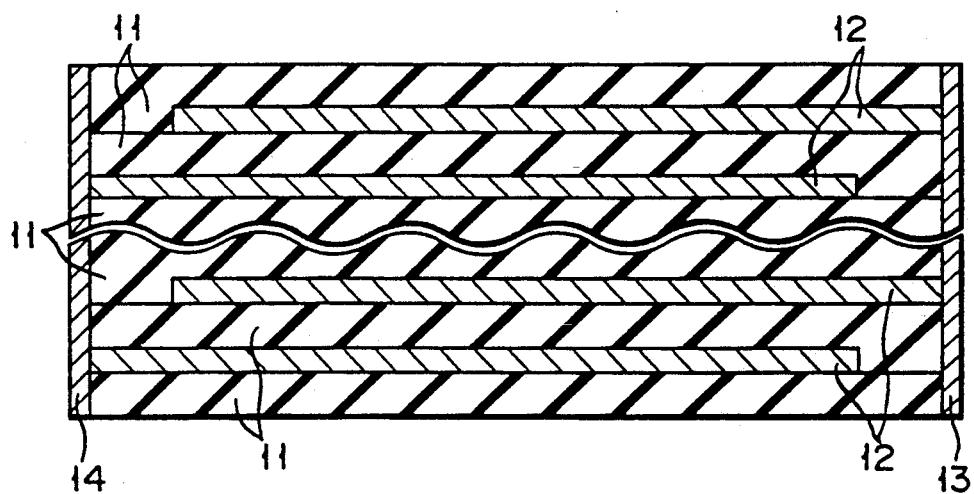
F I G. 1

CERAMIC COMPOSITION AND ELECTRONIC PART USING THE SAME

TECHNICAL FIELD

The present invention relates to a ceramic composition, and, more particularly, to a ceramic composition having a high dielectric constant, capable of forming dielectrics excellent in mechanical strength, and capable of providing an electronic part having a high reliability. The present invention also relates to an electronic part having at least one dielectric layer.

BACKGROUND ART

Ceramic compositions which form dielectrics upon sintering are widely used for forming various electronic parts such as capacitors and piezoelectric parts. Among these electronic parts, electronic parts of ceramic-multilayer type such as a multilayer ceramic capacitor and a multilayer ceramic actuator are being developed at a high speed in recent years. For manufacturing an electronic part of this type, a ceramic composition in a powder form is formed into a sheet, followed by coating the sheet with an electrode paste acting as an inner electrode. Then, a plurality of such ceramic/paste laminates are superposed one upon the other, followed by compressing the superposed body and subsequently sintering the superposed body.

A ceramic material containing barium titanate as a main component is known in the art as a material used for manufacturing an electronic part of this type. However, such a high temperature as 1300° to 1400° C. is required for sintering barium titanate. Naturally, it is necessary for the metal used as the inner electrode, which is sintered together with the ceramic material, not to be oxidized and converted into an insulating material at the high sintering temperature, or not to be melted at the high sintering temperature. The inner electrode metal, which meets the requirement noted above, is restricted to noble metals such as gold, platinum and palladium, which are costly. It follows that the electronic part thus manufactured can be used in only the field in which the high manufacturing cost is not of importance.

If the sintering temperature of the ceramic composition can be lowered, it may be possible to widen the scope of selection of the metal which can be used as an inner electrode of a ceramic electronic part, leading to a low manufacturing cost of the electronic part. For example, if a ceramic composition which can be sufficiently sintered at 1050° C. or less has been developed, it is possible to use a 80% silver/20% palladium alloy in place of a 100% palladium. This alloy is available at a cost less than 1/20 the cost of 100% palladium.

In recent years, vigorous studies are being made on ceramic compositions which can be sintered at a relatively low temperature, particularly, on compositions which provide dielectrics of a complex perovskite structure which contains lead in A-site upon sintering. Such compositions are also practically used. The ceramic compositions of this type include, for example, an oxide composition which can be converted upon sintering into a dielectric of the perovskite structure represented by the formula:

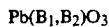

where $B_1$ is selected from Mg, Zn, Ni, Co, Fe, Mn and In, and $B_2$ is selected from Nb, W, Ta and Sb. This ceramic composition can be sintered at 900° to 1100° C., thus making it possible to use a Ag/Pd alloy having a high silver content, which is relatively cheap, for forming the inner electrode.

However, the sintered body of the lead based complex perovskite composition is low in its mechanical strength. Thus, the sintered body is highly likely to be cracked in the manufacturing process of the electronic part, leading to a low product yield. Further, traces of water permeates through the cracks into the interior region of the electronic part, with the result that the metal of the electrode migrates into the dielectric layer under the action of the voltage applied to the electronic part during the operation of the electronic apparatus and the water entering the sintered body. It follows that the insulating property of the dielectric layer is lowered, leading to a low reliability of the product.

Therefore, an object of the present invention is to provide a dielectric ceramic composition which can be sintered at a relatively low temperature to provide a dielectric exhibiting a high mechanical strength and preventing water permeation even under a high humidity, and thus is capable of providing an electronic part having a high reliability.

Another object of the invention is to provide a highly reliable electronic part comprising at least one dielectric layer.

DISCLOSURE OF THE INVENTION

To achieve the object described above, the present invention provides a ceramic composition comprising oxides of Pb, A, $B_1$ and $B_2$ in amounts sufficient to provide, upon sintering, a dielectric of a crystal structure represented by general formula:

$$Pb_{1-x}A_x(B_1,B_2)O_3 \qquad (1)$$

where A is at least one element selected from the group consisting of Ca, Sr, Ba, Ag, La and Nd, $B_1$ is at least one element selected from the group consisting of Mg, Zn, Ni, Co, Fe, Mn and In, $B_2$ is at least one element selected from the group consisting of Nb, W, Ta and Sb, x is from 0 to 0.5, and [A]/[B] is 0.95 or more, but 0.99 or less, wherein [A] represents the total number of mols of the elements constituting A-site comprising $Pb_{1-x}$ and $A_x$, and [B] represents the total number of mols of the elements constituting B-site comprising $B_1$ and $B_2$.

Ti may be added to the ceramic composition of present invention in order to enable the sintered dielectric body of the composition to exhibit temperature characteristics adapted for the dielectric.

It is also possible to add to the ceramic composition of the present invention 0.01 to 1% by weight of glass based on the weight of the ceramic composition, said glass containing, as a component thereof, oxides selected from the group consisting of $B_2O_3$, $SiO_2$, $Al_2O_3$, $BaO$, $ZnO$, $PbO$, $Bi_2O_3$, $Li_2O$ and $Ag_2O$. The glass addition permits further lowering the sintering temperature of the ceramic composition.

It should be noted that the dielectric sintered body obtained by sintering the ceramic composition of the present invention and the electronic part including a dielectric layer prepared from the ceramic composition of the present invention are also within the scope of the present invention.

BRIEF DESCRIPTION OF THE DRAWING

FIG. 1 is a cross sectional view schematically showing an electronic part manufactured by using the dielectric composition of the present invention.

BEST MODE OF CARRYING OUT

The sintered dielectric of the present invention has a complex perovskite structure represented by a general formula:

$$Pb_{1-x}A_x(B_1,B_2)O_3 \quad (I)$$

In formula (I), component A, which forms A-site together with Pb, is Ca, Sr, Ba, Ag, La, Nd, or a mixture of two or more of these. x is 0 to 0.5.

$B_1$, which provides one component, forming B-site, is selected from Mg, Zn, Ni, Co, Fe, Mn, In, and a mixture of two or more of these. $B_2$, which constitutes B-site together with the component $B_1$, is selected from Nb, W, Ta, Sb, and a mixture of two or more of these. The ratio of components $B_2$ to $B_1$ should be selected to permit the sum of valencies of $B_1$ and $B_2$ to be four. For example, where a divalent Mg and a pentavalent Nb are used as $B_1$ and $B_2$, respectively, the ratio Mg:Nb should be $\frac{1}{3}:\frac{2}{3}$.

In the present invention, the ratio [A]/[B] is chosen to fall within a range of between 0.95 and 0.99, [A] representing the total number of mols of the elements constituting A-site consisting of $Pb_{1-x}$ and $A_x$, and [B] representing the total number of mols of the elements constituting B-site consisting of $B_1$ and $B_2$. If the ratio exceeds 0.99, the resulting sintered body (dielectric) fails to exhibit a sufficiently high mechanical strength. If the ratio is 0.94 or less, however, the dielectric constant of the resultant sintered body is lowered. In other words, by setting the ratio [A]/[B] within a range of between 0.95 and 0.99, the mechanical strength of the sintered body can be increased while maintaining high dielectric properties. The increase in the mechanical strength is considered to be due to the fact that the fracture mode becomes transgranular fracture, not the intergranular fracture.

Examples of the compositions represented by formula (I) are shown below:

$Pb_{1-x}A_x[(Mg_{\frac{1}{3}}Nb_{\frac{2}{3}})(Zn_{\frac{1}{3}}Nb_{\frac{2}{3}})Ti]O_3$ $Pb_{1-x}A_x(Fe_{\frac{1}{2}}Nb_{\frac{1}{2}})O_3$ $Pb_{1-x}A_x(Fe_{\frac{2}{3}}W_{\frac{1}{3}})O_3$ $Pb_{1-x}A_x(Ni_{\frac{1}{3}}Nb_{\frac{2}{3}})O_3$ $Pb_{1-x}A_x(Mg_{\frac{1}{2}}W_{\frac{1}{2}})O_3$ $Pb_{1-x}A_x(Mn_{\frac{1}{3}}Nb_{\frac{2}{3}})O_3$ $Pb_{1-x}A_x(Mg_{\frac{1}{3}}Ta_{\frac{2}{3}})O_3$ $Pb_{1-x}A_x(Co_{\frac{1}{3}}Nb_{\frac{2}{3}})O_3$ $Pb_{1-x}A_x(Co_{\frac{1}{2}}W_{\frac{1}{2}})O_3$ The sintered body of the present invention can be obtained by a conventional method. Specifically, lead oxide (PbO), an oxide of component A (CaO, SrO, BaO, $Ag_2O$, $La_2O_3$ and/or $Nd_2O_3$), an oxide of component $B_1$ (MgO, ZnO, NiO, CoO, $Fe_2O_3$, MnO and/or $In_2O_3$), and an oxide of component $B_2$ ($Nb_2O_5$, $WO_3$, $Ta_2O_3$ and/or $Sb_2O_3$) are blended in powders in a molar ratio which is determined in accordance with formula (I), and water is added thereto, followed by uniformly mixing the mixture. A plurality of the laminated bodies thus formed are superposed one upon the other such that, when the superposed structure is cut in a thickness direction, the edges of the inner electrodes of the laminated bodies alternately exposed to the two cut surfaces of the superposed body. The superposed body is compressed within a heating mold, followed by cutting the superposed body in a thickness direction at a predetermined position. The cut piece is then sintered at a predetermined temperature, followed by coating the out surfaces of the sintered body, to which the inner electrodes are exposed, with an electrode paste such as a silver paste, which is then baked. One example of the laminated ceramic capacitor thus formed is shown in FIG. 1. The capacitor includes a dielectric layer 11 formed from the composition of the present invention, an inner electrode 12, and outer electrodes 13 and 14 consisting of, for example, Ag and baked to the cut surfaces thereof.

As described previously, the ceramic composition of the present invention can be sintered at a relatively low temperature of 1100° C. or lower. This makes it possible to use a relatively cheap metallic material, e.g., an Ag/Pd alloy having a relatively high Ag content, for forming the inner electrode. It has been found that the sintering temperature can be lowered to 1050° C. or less by adding to the ceramic composition of the present invention a glass containing an oxide After the mixture is dried, the mixture is calcined at 600° to 800° C. The calcined mass is pulverized to an average particle size of 1 μm or less, followed by drying the pulverized composition to remove water therefrom. Further, a binder such as polyvinyl alcohol or acrylic resin is added to the dried powdery particles, together with a plasticizer and/or an organic solvent, as desired, and the composition is formed into a desired shape. Finally, the shaped body is sintered to obtain a desired sintered body. The composition of the sintered body substantially conforms with that of the raw material oxide mixture. The composition of the present invention can be sintered at temperatures of 1100° C. or lower and forms a sintered body having a high dielectric constant and a high mechanical strength, and exhibiting an excellent resistance to humidity. Incidentally, the sintering temperature denotes the lowest temperature at which the sintered body is enabled to exhibit the highest density and the highest dielectric constant.

In order to manufacture a ceramic electronic part of a multilayer type, e.g., a multilayer ceramic capacitor, a calcined dry particulate composition prepared as described above is formed into a sheet. One surface of the sheet thus formed is coated by means of, for example, a screen printing method with a paste containing a powder of an inner electrode metal. selected from the group consisting of $B_2O_3$, $SiO_2$, $Al_2O_3$, BaO, ZnO, PbO, $Bi_2O_3$, $Li_2O$ and $Ag_2O$ in an amount of 0.01 to 1% by weight based on the weight of the ceramic composition, while maintaining or improving the characteristics of the dielectric body. If the amount of the glass component is smaller than 0.01% by weight, it is substantially impossible to obtain the effect of lowering the sintering temperature. If the amount exceeds 1%, however, the dielectric constant of the sintered body is markedly lowered. The glass component is added to a calcined and pulverized particulate composition of the ceramic raw materials (powdery oxides of lead, elements A, $B_1$ and $B_2$). The glass component becomes to be present at the crystal boundary of the sintered body.

As described above, the ceramic composition of the present invention can be sintered at a relatively low temperature. Also, the sintering temperature can be further lowered by adding a glass component to the composition. It follows that the composition of the present invention permits using a cheap metal for forming an inner electrode. In addition, the dielectric prepared by sintering the ceramic composition of the present invention exhibits a high mechanical strength and prevents moisture from entering under a high humidity condition. It follows that the ceramic composition of the present invention makes it possible to provide an electronic part of a high reliability.

Example I

Powders of PbO, BaO, MgO, $Nb_2O_5$, ZnO and $TiO_2$ were mixed at a mixing ratio which provides: $(Pb_{0.825}Ba_{0.125})_{[A]} - [(Mg_{\frac{1}{3}}Nb_{\frac{2}{3}})_{0.5}(Zn_{\frac{1}{3}}Nb_{\frac{2}{3}})_{0.3} - Ti_{0.2}]_{[B]}O_3$ ($[A]/[B] = 1.02$ to $0.94$).

The mixture was uniformly mixed in a ball mill with a deionized water added thereto and, then, dried. The titanium addition was intended to elevate the temperature at which the sintered body of the composition exhibits the highest dielectric constant so as to meet the standard in the temperature characteristics of the capacitance of the capacitor (e.g., EIA standard in the United States). The titanium thus used enters B-site. The mixture was calcined at 800° C., followed by pulverizing the calcined mixture to an average particle size of 1 μm or less, and heating the mixture to remove water therefrom. The calcined powder was added with 5% by weight of polyvinyl alcohol as a binder together with or without $B_2O_3$—$SiO_2$—$Al_2O_3$-based glass as shown in Table 1. The mixture was formed into a disk having a diameter of 17 mm and a thickness of 5 mm. The disk was sintered at a temperature within a range of 950° C. to 1200° C. for 2 hours, followed by measuring the density of the sintered body. The temperature at which the highest density of the sintered body was obtained was recorded as a sintering temperature. Further, Vickers hardness and bending strength of the sintered disk sample were measured, with the fracture mode of the sample in these tests being also recorded.

Electrodes were formed by baking a silver paste onto both surfaces of the sintered disk so as to measure the capacitance thereof. Further, a relative dielectric constant was calculated on the basis of the capacitance thus measured, the electrode area and the thickness of the sample. The result are shown in Table 1.

As apparent from Table 1, the sintering temperature of the ceramic composition becomes higher with decrease in the ratio [A]/[B] within a range of between 1.02 and 0.94. On the other hand, the sintered sample exhibits the highest relative dielectric constant in the case where the ratio [A]/[B] is 1.00, with the relative dielectric constant diminishing toward the upper or lower limit of range of the ratio [A]/[B] defined in the present invention. This tendency is also recognized in the case where a glass component is added to the ceramic composition. However, the addition of the glass component lowers the sintering temperature by about 100° C.

Table 1 also shows that the Vickers hardness and bending strength of the sintered body in the case where the ratio [A]/[B] is 1.00 or more widely differ from those in the case where the ratio [A]/[B] is 0.99 or less. Further, the glass addition permits improving the Vickers hardness to some extent.

To reiterate, the ceramic composition of the present invention in which the ratio [A]/[B] is defined to fall within a range of between 0.99 and 0.95 can be sintered at a relatively low temperature to provide a sintered body exhibiting excellent mechanical characteristics such as the Vickers hardness and the bending strength, though the dielectric constant of the sintered body is lowered to some extent. Further, the glass addition permits lowering the sintering temperature of the ceramic composition and also permits improving the mechanical characteristics of the sintered body.

Example II

Ceramic raw material powders of the same composition as that in Example I were calcined, pulverized and, then, dried, as in Example I. Further, a glass component was added to some of the samples. Thus, 28 kinds of powdery ceramic compositions were prepared. An acrylic resin acting as a binder was added to each powdery composition together with a plasticizer, and the resultant mixture was stirred with a solvent to prepare a slurry.

Each slurry was formed into a green sheet on an organic film by means of a doctor blade method, followed by peeling the green sheet from the organic film. The resultant green sheet was punched into a predetermined shape and size. One surface of the punched sheet was coated with an inner electrode paste containing a 80% Ag/20% Pd alloy powder or an inner electrode paste containing a 70% Ag/30% Pd alloy powder by means of screen printing method, followed by drying the paste. 40 pieces of the sheet structure were superposed one upon the other such that the inner electrode of one laminate structure is exposed to one punched surface of the superposed body, with the inner electrode of the adjacent laminate structure being exposed to the other punched surface. Further, five dummy sheets, which were not coated with the electrode paste, were superposed on each of the uppermost laminate structure of the superposed body and the lowermost laminate structure, followed by compressing the resultant body within a heating mold. Then, the compressed body was cut at a predetermined position so as to form a laminated shaped body, followed by sintering the laminate at temperatures determined in view of the composition of the ceramic body shown in Table 1. Further, the cut surfaces of the laminate to which the inner electrodes were exposed were coated with a silver paste, followed by baking the silver paste to form outer electrodes, preparing a chip type laminated ceramic capacitor sized at 4.5×3.2×2.5 (mm). Tables 2 and 3 show various characteristics of the laminated ceramic capacitors thus prepared. Table 2 covers the case of using the 80% Ag/20% Pd alloy for forming the inner electrode, with Table 3 covering the case of using the 70% Ag/30% Pd alloy for forming the inner electrode. The data given in Table 2 and 3 denote the average value of 100 samples for each kind of the multilayer ceramic capacitor. Shown in each of Tables 2 and 3 is failure rate (%) under load in moisture. For determining the failure rate, a DC voltage of 5 V was continuously applied for 1000 hours to each sample put under a constant temperature of 85° C. and a constant relative humidity of 95%. The capacitor sample which exhibited an insulation resistance of 500 Ω.F or less after the test was determined to be in failure.

As apparent from Tables 2 and 3, the fracture mode of the capacitor becomes the intergranular fracture where the molar ratio [A]/[B], i.e., the molar ratio of A-site constituting elements to the B-site constituting elements, is 1 or more, leading to a high failure rate under a load in moisture. However, where the ratio

[A]/[B] is 0.99 or less, the fracture mode of the capacitor becomes the transgranular fracture, leading to a low failure rate under a load in moisture. To be more specific, where the ratio [A]/[B] is 1.0 or more, the sintered body is caused to bear micro-cracks in the sintering process by the stress derived from the difference in the thermal expansion-shrinkage coefficient between the dielectric and the inner electrode. It should be noted that water permeates into the sintered body through the micro-cracks during the humidity resistance test. The water permeating into the sintered body electrochemically ionizes the inner electrode metal under the action of the electric field. Further, the ionized metal migrates along the microcracks toward the counter electrode and is precipitated there, with the result that the insulation resistance of the capacitor is markedly lowered so as to bring about the failure. On the other hand, where the ratio [A]/[B] is 0.99 or less, the fracture mode of the capacitor is the transgranular fracture. Thus, the capacitor has a high mechanical strength and does not bear micro-cracks. Naturally, failure is not brought about in the capacitor.

Incidentally, when it comes to the dielectric body having the ratio [A]/[B] of 1.00, the fracture mode was the transgranular fracture in the case of the dielectric itself, i.e., dielectric disk (Comparative Examples 1 and 2 shown in Table 1). Where a multilayer capacitor was formed by using the dielectric, however, the fracture mode was turned into the intergranular fracture because of, for example, the interaction between the dielectric and the inner electrode (Comparative Examples 1-1, 2-1, 1-2, and 2-2 shown in Tables 2 and 3), leading to reduction in the mechanical strength.

The sintering temperature of the ceramic composition is increased with decrease of the molar ratio [A]/[B] from 0.99. Thus, it was possible to measure the capacitance in all the samples shown in Table 2 in which 70% Ag/30 Pd alloy was used for forming the inner electrode. In the samples shown in Table 3, however, 80% Ag/20 Pd alloy was used for forming the inner electrode. Among these samples, the sintering temperature of the dielectric exceeds the optimum baking temperature of the inner electrode in Examples 1-2, 3-2 and 7-2, with the result that the continuity of the inner electrode is lost in these Examples. Thus, it was impossible to measure the capacitance in these Examples. This was also the case with Reference Example 4-2. It should be noted in this connection that it is possible to lower the sintering temperature by adding a glass component to the ceramic composition. As a matter of fact, desired properties were obtained in the capacitors of Examples 2-2, 4-2, 5-2, 6-2 and 8-2 shown in Table 3, i.e., the Examples in which a glass component was added to the ceramic composition. Incidentally, the capacitors of Reference Examples 3-1 and 3-2 were found to be low in capacitance. On the other hand, the sintering temperature of the precursor composition was high and the capacitance was low in the capacitors of Reference Examples 4-1 and 4-2.

Although the present invention has been described with reference to the specific embodiments thereof, it should not be restricted thereto. For example, the addition of various additives such as $MnO_2$, MgO, NiO, $ZrO_2$, CoO, $Sb_2O_3$ and $La_2O$ for improving the dielectric characteristics of the ceramic composition is also within the scope of the invention. These additives may be mixed in an amount of 0.1 to 1 mol % with the ceramic composition before the calcining step.

TABLE 1

| No. | [A]/[B] | Glass Addition (wt %) | Sintering Temp. (°C.) | Relative Dielectric ($\epsilon\gamma$) | Fracture Mode | Vickers Hardness (kg/mm$^2$) | Bending Strength (kg/cm$^2$) |
|---|---|---|---|---|---|---|---|
| Reference Example 1 | 1.02 | None | 1,050 | 12,500 | Intergranular Fracture | 460 | 730 |
| Reference Example 2 | 1.02 | 0.1 | 980 | 12,100 | Intergranular Fracture | 480 | 740 |
| Comparative Example 1 | 1.00 | None | 1,080 | 12,000 | Transgranular Fracture | 560 | 1,000 |
| Comparative Example 2 | 1.00 | 0.1 | 1,000 | 11,900 | Transgranular Fracture | 570 | 1,010 |
| Example 1 | 0.99 | None | 1,100 | 11,500 | Transgranular Fracture | 600 | 1,030 |
| Example 2 | 0.99 | 0.1 | 1,000 | 11,300 | Transgranular Fracture | 630 | 1,050 |
| Example 3 | 0.98 | None | 1,120 | 11,000 | Transgranular Fracture | 610 | 1,050 |
| Example 4 | 0.98 | 0.01 | 1,040 | 10,500 | Transgranular Fracture Destruction Mode | 620 | 1,070 |
| Example 5 | 0.98 | 0.1 | 1,020 | 10,300 | Transgranular Fracture | 640 | 1,080 |
| Example 6 | 0.98 | 1.0 | 1,000 | 9,600 | Transgranular Fracture | 640 | 1,090 |
| Reference Example 3 | 0.98 | 2.0 | 1,000 | 7,500 | Transgranular Fracture | 640 | 1,090 |
| Example 7 | 0.95 | None | 1,150 | 9,300 | Transgranular Fracture | 590 | 1,080 |
| Example 8 | 0.95 | 0.1 | 1,020 | 9,000 | Transgranular Fracture | 620 | 1,110 |
| Reference Example 4 | 0.94 | 0.1 | 1,120 | 7,200 | Transgranular Fracture | 620 | 1,080 |

TABLE 2

Inner Electrode: 70% Ag/30% Pd

| No. | Composition | Sintering Temp. (°C.) | Capacitance (μF) | Fracture Mode | Failure Rate under Humidity Load (%) |
|---|---|---|---|---|---|
| Reference Example 1-1 | Reference Example 1 | 1,050 | 1.10 | Intergranular Fracture | 18 |
| Reference Example 2-1 | Reference Example 2 | 980 | 1.09 | Intergranular Fracture | 14 |
| Comparative Example 1-1 | Comparative Example 1 | 1,080 | 1.18 | Intergranular Fracture | 6 |
| Comparative Example 2-1 | Comparative Example 2 | 1,000 | 1.15 | Intergranular Fracture | 5 |
| Example 1-1 | Example 1 | 1,100 | 1.03 | Transgranular Fracture | 0 |
| Example 2-1 | Example 2 | 1,000 | 1.02 | Transgranular Fracture | 0 |
| Example 3-1 | Example 3 | 1,120 | 0.98 | Transgranular Fracture | 0 |
| Example 4-1 | Example 4 | 1,040 | 0.95 | Transgranular Fracture | 0 |
| Example 5-1 | Example 5 | 1,020 | 0.93 | Transgranular Fracture | 0 |
| Example 6-1 | Example 6 | 1,000 | 0.85 | Transgranular Fracture | 0 |
| Reference Example 3-1 | Reference Example 3 | 1,000 | 0.66 | Transgranular Fracture | 0 |
| Example 7-1 | Example 7 | 1,150 | 0.83 | Transgranular Fracture | 0 |
| Example 8-1 | Example 8 | 1,020 | 0.81 | Transgranular Fracture | 0 |
| Reference Example 4-1 | Reference Example 4 | 1,120 | 0.64 | Transgranular Fracture | 0 |

TABLE 3

Inner Electrode: 80% Ag/20% Pd

| No. | Composition | Sintering Temp. (°C.) | Capacitance (μF) | Fracture Mode | Failure Rate under Humidity Load (%) |
|---|---|---|---|---|---|
| Reference Example 1-2 | Reference Example 1 | 1,050 | 1.10 | Intergranular Fracture | 20 |
| Reference Example 2-2 | Reference Example 2 | 980 | 1.09 | Intergranular Fracture | 13 |
| Comparative Example 1-2 | Comparative Example 1 | 1,080 | 1.18 | Intergranular Fracture | 9 |
| Comparative Example 2-2 | Comparative Example 2 | 1,000 | 1.15 | Intergranular Fracture | 3 |
| Example 1-2 | Example 1 | 1,100 | Impossible to measure | Transgranular Fracture | — |
| Example 2-2 | Example 2 | 1,000 | 1.02 | Transgranular Fracture | 0 |
| Example 3-2 | Example 3 | 1,120 | Impossible to measure | Transgranular Fracture | — |
| Example 4-2 | Example 4 | 1,040 | 0.95 | Transgranular Fracture | 0 |
| Example 5-2 | Example 5 | 1,020 | 0.93 | Transgranular Fracture | 0 |
| Example 6-2 | Example 6 | 1,000 | 0.85 | Transgranular Fracture | 0 |
| Reference Example 3-2 | Reference Example 3 | 1,000 | 0.66 | Transgranular Fracture | 0 |
| Example 7-2 | Example 7 | 1,150 | Impossible to measure | Transgranular Fracture | — |
| Example 8-2 | Example 8 | 1,020 | 0.81 | Transgranular Fracture | 0 |
| Reference Example 4-2 | Reference Example 4 | 1,120 | Impossible to measure | Transgranular Fracture | — |

We claim:

1. A dielectric ceramic composition comprising oxides of Pb, A, $B_1$ and $B_2$ in amounts sufficient to provide, when sintered, a dielectric of a crystal structure represented by general formula:

$$(Pb_{1-x}A_x)_a\{(B_1)_{1-y}(B_2)_y\}_bO_3 \quad (I)$$

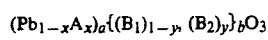

where A is at least one element selected from the group consisting of Ca, Sr, Ba, Ag, La and Nd, $B_1$ is at least one element selected from the group consisting of Mg, Zn, Ni, Co, Fe, Mn and In, $B_2$ is at least one element selected from the group consisting of Nb, W, Ta and Sb, x is more than 0 to 0.5, y is ½ when $B_2$ is W, or ⅓ when $B_2$ is Nb, Ta or Sb, a represents the total number of mols of the elements constituting A-site comprising $Pb_{1-x}$ and $A_x$, and b represents the total number of mols of the element constituting B-site comprising $B_1$ and $B_2$, and the ratio a/b is from 0.95 to 0.99.

2. The composition according to claim 1 which further comprises 0.01 to 1% by weight of a glass component containing an oxide selected from the group consisting of $B_2O_3$, $SiO_2$, $Al_2O_3$, BaO, ZnO, PbO, $Bi_2O_3$, $Li_2O$ and $Ag_2O$.

3. A dielectric prepared by sintering the composition of claim 1.

4. A dielectric having a crystal structure presented by general formula:

$$(Pb_{1-x}A_x)_a\{(B_1)_{1-y}(B_2)_y\}_bO_3 \qquad (I)$$

where A is at least one element selected from the group consisting of Ca, Sr, Ba, Ag, La and Nd, $B_1$ is at least one element selected from the group consisting of Mg, Zn, Ni, Co, Fe, Mn and In, $B_2$ is at least one element selected from the group consisting of Nb, W, Ta and Sb, x is more than 0 to 0.5, y is ½ when $B_2$ is W, or ⅓ when $B_2$ is Nb, Ta or Sb, a represents the total number of mols of the elements constituting A-site comprising $Pb_{1-x}$ and $A_x$, and b represents the total number of mols of the element constituting B-site comprising $B_1$ and $B_2$, and the ratio a/b is from 0.95 to 0.99.

5. A multilayer ceramic capacitor comprising dielectric layers with an inner electrode interposed therebetween, said dielectric layers comprising the dielectric of claim 3.

6. A multilayer ceramic capacitor comprising dielectric layers with an inner electrode interposed therebetween, said dielectric layers comprising the dielectric of claim 4.

* * * * *

UNITED STATES PATENT AND TRADEMARK OFFICE
CERTIFICATE OF CORRECTION

PATENT NO. : 5,182,695
DATED : January 26, 1993
INVENTOR(S) : Kiyoji Handa et al.

It is certified that error appears in the above-identified patent and that said Letters Patent is hereby corrected as shown below:

On the title page, Item [86],

The § 371 Date and the § 102(e) Date are incorrect, should be,

--§ 371 Date: Aug. 22, 1991

§ 102(e) Date: Aug. 22, 1991--

Signed and Sealed this

Twenty-ninth Day of March, 1994

Attest:

BRUCE LEHMAN

Attesting Officer

Commissioner of Patents and Trademarks